United States Patent Office 3,629,478
Patented Dec. 21, 1971

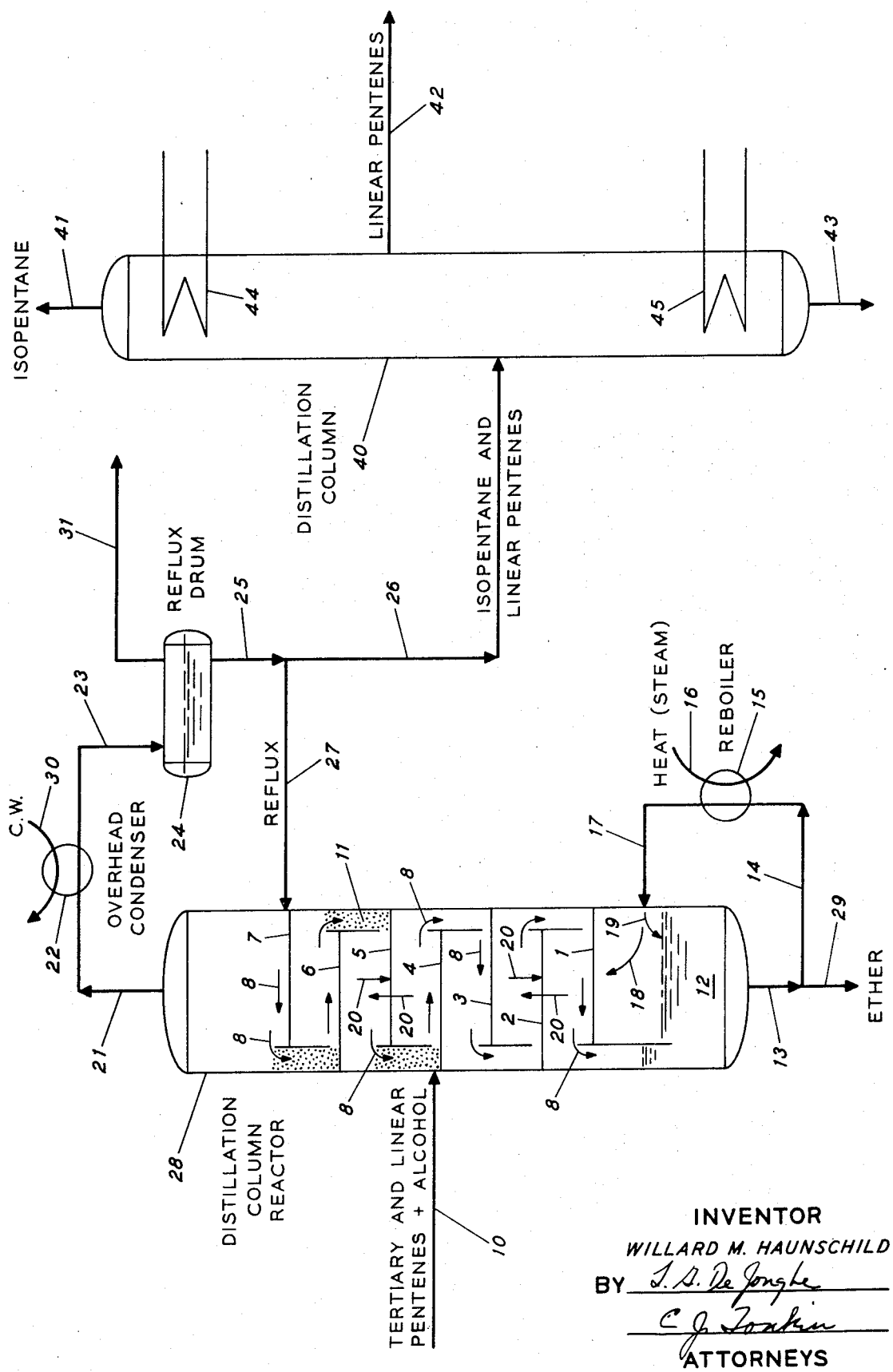

3,629,478
SEPARATION OF LINEAR OLEFINS
FROM TERTIARY OLEFINS
Willard M. Haunschild, Walnut Creek, Calif., assignor to Chevron Research Company, San Francisco, Calif.
Filed Aug. 22, 1969, Ser. No. 852,227
Int. Cl. C07c 11/12
U.S. Cl. 260—677 A
7 Claims

ABSTRACT OF THE DISCLOSURE

Linear pentenes are separated from tertiary pentenes by:
(a) Feeding a mixture of alcohol, tertiary pentenes and linear pentenes to a distillation column reactor at a feed zone;
(b) Catalytically reacting the tertiary pentenes with the alcohol by contacting them with heterogeneous catalyst located in a plurality of zones above the feed zone, thereby forming an ether;
(c) Fractionating the ether from the linear pentene in the distillation column reactor;
(d) Withdrawing the ether from the distillation column reactor at a position below the feed zone; and
(e) Withdrawing the linear pentenes from the distillation column reactor at a position above the feed zone.

BACKGROUND OF THE INVENTION

Field of the invention

The present invention relates to catalysis and distillation. More particularly, the present invention relates to heterogeneous catalysis and the separation of linear olefins from tertiary olefins.

Description of the prior art

My application titled "Separation and Catalysis" Ser. No. 852,269, filed on or about Aug. 22, 1969 relates to recovery or separation of a first chemical from a mixture of chemicals. One of the uses mentioned for the process disclosed in that application is the separation of tertiary olefins from a mixture of hydrocarbons. According to the process disclosed in my application "Separation and Catalysis" two distillation column reactors are used in series. When the process disclosed in my application "Separation and Catalysis" is used to separate tertiary olefins from hydrocarbons, ethers, for example, are formed in the first distillation column reactor, withdrawn from the bottom of the first distillation column reactor, fed to the second distillation column reactor and therein decomposed to an alcohol and the tertiary olefin which is desired to be recovered.

In contrast to that process as disclosed in my application titled "Separation and Catalysis," the present patent application is directed to the separation of linear olefins, particularly linear pentenes, rather than to the recovery of tertiary olefins from a mixture of hydrocarbons. Much of the prior art pertinent to the present invention is disclosed in my application titled "Separation and Catalysis" filed on about Aug. 22, 1969 and in my application titled "Distillation of Volatile Reactants and Heterogeneous Catalysis" filed on or about Aug. 22, 1969. The disclosures of both of these applications are hereby incorporated by reference in their entirety into the present application.

U.S. Pat. 2,391,084 discloses a process for making motor fuel from a mixture of hydrocarbon gases containing normal butene, isobutene and isobutane. According to the process discussed in U.S. Pat. 2,391,084, the gases are reacted in an etherating zone with methanol in the presence of sulfuric acid under conditions at which methyl tertiary butene ether is formed from said butene and methanol and normal butene is largely unaffected. U.S. Pat. 2,391,084 discloses that because of the greater speed of the reaction between methanol and isobutene, the isobutene is preferentially etherated in the reactor. Thus it is known in the art that tertiary olefins react faster with alcohols than do linear olefins.

U.S. Pat. 2,391,084 does not disclose the use of a heterogeneous catalyst for the etheration reaction but rather the use of a homogeneous catalyst (or water sequestering agent) as for example sulfuric acid. Also, U.S. Pat. 2,391,084 does not disclose the use of a distillation column reactor. In addition, U.S. Pat. 2,391,084 is directed to obtaining ethers from a hydrocarbon feedstock containing tertiary olefins rather than to recovery of linear olefins from a hydrocarbon feedstock comprised of a mixture of linear olefins and tertiary olefins.

In this specification, the term "tertiary olefins" means an olefin containing a carbon atom bonded to 3 other carbon atoms and connected to one of these carbon atoms by a double bond.

For certain processes, it is desired to have a feedstock comprised of linear pentenes which is substantially free of other types of olefins. Linear pentenes are present in a number of refinery hydrocarbon streams, as for example in light gasoline from a catalytic cracking unit. If the light gasoline from a catalytic cracking unit is de-pentenized, a mixture of closely boiling hydrocarbons is obtained. As can be judged from the partial list of the $C_5$ hydrocarbons below, it is very difficult to separate the linear pentenes from the tertiary olefins by fractional distillation.

| Hydrocarbon: | Boiling point ° C. |
|---|---|
| Cis pentene-2 | 37.8 |
| Trans pentene-2 | 36.3 |
| Pentene-1 | 30.0 |
| 2-methyl-butene-1 | 31.2 |
| 2-methyl-butene-2 | 38.6 |
| 3-methyl-butene-1 | 20.1 |
| Isopentane | 27.9 |
| n-Pentane | 36.1 |

Generally the linear pentene stream which is withdrawn from the distillation column reactor is subjected to further fractionation, to remove paraffins for example, to obtain the product linear pentenes.

In addition to the separation difficulty because of the close proximity of the boiling points, it can be seen that 2-methyl butene-1 boiling at 31.2° C. boils between pentene-1 (30° C.) and the pentene-2's (37.8° C. and 36.3° C.). Thus in previously proposed processes even with a very large number of trays only a relatively small proportion of the pentene-2's could be recovered from the mixture of hydrocarbons by distillation, and furthermore, the desired linear pentene-1 was sacrificed because its boiling point is slightly below the boiling point of the tertiary pentene, 2-methyl butene-1.

SUMMARY OF THE INVENTION

According to the present invention, a process is provided for separating linear pentenes from tertiary pentenes which process comprises:
(a) Feeding a mixture of tertiary pentenes and linear pentenes to a distillation column reactor at a feed zone;
(b) Feeding an alcohol to the distillation column reactor;
(c) Contacting the mixture of pentenes and the alcohol with heterogeneous catalyst located in a plurality of zones above the feed zone, thereby catalytically reacting the tertiary pentene with the alcohol to form an ether;
(d) Fractionating the ether from the linear pentenes in the distillation column reactor;

(e) Withdrawing the ether from the distillation column reactor at a position below the feed zone; and (f) Withdrawing the linear pentenes from the distillation column reactor at a position above the feed zone.

The reaction of tertiary olefins with alcohols such as methyl and other lower alcohols having 6 or less carbon atoms to form ethers is equilibrium limited. It has been determined that this equilibrium limitation on the yield of ethers from the reaction of tertiary olefin with alcohol is advantageously overcome by carrying out the reaction in a distillation column reactor. In the distillation column reactor the heavier or less volatile component, i.e., the particular ether which is formed is constantly fractionated downward away from the lighter or more volatile tertiary olefin and alcohol. Because the ether is constantly removed from the olefin and alcohol, the reaction does not come up against the equilibrium limitation point and, therefore, more ether may continue to be formed as the tertiary olefin and alcohol are fractionated upward in the distillation column in contact with heterogeneous catalyst located in the upper part of the distillation column, until the tertiary olefin is completely removed. The heterogeneous catalyst used is, of course, a heterogeneous catalyst effective to catalyze the reaction of the feed tertiary olefin with the feed alcohol. By a suitable number of reaction and separation stages it is possible to reduce the residual tertiary olefin remaining in the overhead stream to essentially any desired level.

According to the process of the present invention, it has been determined that this type of operation is advantageously applied to obtain the separation of linear pentenes from tertiary pentenes. The linear pentenes have been found to be essentially non-reactive with the alcohol whereas the tertiary pentenes react very rapidly with the alcohol to form ether. Thus, in the process of the present invention the tertiary pentenes are constantly fractionated away form the pentene-2's and also away from pentene-1 (in general away from the other feed components) by virtue of their conversion to the heavier and less volatile ether which travels downward in the distillation column reactor.

The boiling point of methyl t-amyl ether is 99.5° C. as contrasted to boiling points in the range of 30 to 40° C. for the various $C_5$ olefins. Thus when the ether is formed in the distillation column reactor in accordance with the process of the present invention, it is relatively easy to fractionate the ether away from the linear pentenes. Azeotrope mixtures which result because of the presence of alcohol are preferably handled by water washing to remove excess alcohol from the distillation column reactor.

BRIEF DESCRIPTION OF THE DRAWING

The drawing schematically illustrates a preferred process flow scheme and type of distillation column reactor as contemplated by the inventor for the practice of the present invention.

DETAILED DESCRIPTION

Referring now in more detail to the drawing, olefins and alcohol are introdoced to distillation column reactor 28 via line 10. The alcohol is shown as introduced together with the olefins, but it may be introduced to the distillation column at a separate feed point.

For purposes of description of a preferred embodiment of the present invention, the olefins consist primarily of $C_5$ hydrocarbons. The present invention is also applicable, for example, to the separation of linear butenes from tertiary butenes. The process of this invention in general is applicable to the separation of $C_4$ to about $C_8$ linear olefins from $C_4$ to about $C_8$ tertiary olefins, although it is believed that the present invention is most advantageously applied to the solution of the problem of the separation of linear pentenes from tertiary olefins.

Because the various $C_5$ olefins and alcohol, fore example methanol, are more volatile than the product of the reaction tertiary pentene plus alcohol→ether, the olefins and alcohol tend to move upward in the distillation column and the ether tends to move downward. Preferably the initial part of the reaction is carried out in a traditional reactor vessel or vessels upstream of the distillation column reactor. The reaction may thus be carried out ahead of the distillation column reactor until the forward reaction rate of tertiary pentene plus methanol→tertiary ether is about equalled by the reverse reaction rate of tertiary ether→tertiary pentene plus methanol—that is, until the reaction rate becomes substantially equilibrium limited. Then the equilibrium limited mixture is introduced via line 10 to distillation column reactor 28. In any case—that is, whether or not one or more traditional fixed bed or fluidized bed reactors are used upstream of distillation reactor 28—reactants A and B are introduced to distillation column reactor 28, the variable being whether or not some ether is formed ahead of distillation column reactor 28.

The upward vapor flow of the non-reactive linear pentenes together with non-reacted tertiary olefins and alcohol is indicated by upward pointing arrows 20. For purposes of illustration, it may be assumed that the trays in the distillation column reactor are sieve trays—that is, trays with small holes punched in them so that the upward flowing vapors as indicated by upward pointing arrows 20 may flow up through the sieve trays. Solid particles of heterogeneous catalyst are contained in the downcomers from the respective trays above feed tray 4. The heterogeneous catalyst is indicated by numeral 11.

Liquid flows across the trays and then down through the downcomers in contact with the heterogeneous catalyst. As discussed in my applications previously referred to, the catalyst can be located in position other than the downcomers, for example, the catalyst can be located in small vessels which are connected by piping to the distillation column. The catalyst increases the rate of the reaction tertiary pentene plus methanol→tertiary ether at the particular set of temperature and pressure conditions mainained throughout the column. The trays illustrated in the drawing are known in the fractionation art as single pass trays, with the liquid flowing essentially in one direction only across any given tray. As is well known in the fractionation art, countercurrent flow of liquid and vapor is established in the distillation column due to heat which is introduced to the lower part of the column and heat which is removed near the upper part of the column. In some instances, heat is removed or supplied at intermediate points to the column but the same basic principles of heat balance apply. Also, the condition (enthalpy or heat content) of the feed introduced via line 10 will affect the amount of internal reflux prevailing near the feed zone, i.e., tray 4 in this instance.

In the drawing upward arrows 20 and downward arrows 20 schematically indicate internal reflux—that is, countercurrent liquid and vapor flow—throughout the distillation column. The vapors actually do flow upward through all of the respective trays 1 through 7. However, only a small amount of liquid actually flows through the tray (weepage). The great majority of the liquid flows across each tray and then down through the downcomer as is indicated by arrows 8. The vapors flowing upward in the distillation column and then bubbling through the holes in the trays substantially prevent the liquid from flowing downward through the tray itself. The feed is constantly fractionated as it moves from tray to tray primarily as a result of the vapor-liquid equilibrium resulting as the vapor flows through the liquid on each tray. Thus the nonreactive linear pentenes as well as non-reacted tertiary olefins and alcohol tend primarily to move upward and tertiary ether primarily moves downward. The tertiary ether collects in the bottoms of the column at 12. The tertiary ether is withdrawn from the bottom of the column via line 13 and drawn off for further processing via line 29.

A portion of the ether stream is recycled via line 14 to reboiler 15. Heat, as for example in the form of steam, is supplied to reboiler 15 via line 16. The heat is used to generate vapors by reboiling the product stream introduced to the reboiler via line 14. The bottom stream in line 14 may be completely vaporized or only partially vaporized and withdrawn from the reboiler via line 17. That portion which is not vaporized falls back as indicated by arrow 19 to the bottom's accumulated liquid as indicated by numeral 12. The vapor passes upward as indicated by line 18.

Referring now to the upper part of the column, a vapor stream which contains the desired linear pentenes is withdrawn via line 21. The tertiary olefins are essentially completely reacted with excess alcohol before being fractionated to above tray 7. Thus sufficient contact with the catalyst and a sufficient reflux via line 27 are employed at the particular set of temperature conditions maintained in the upper part of the column so that essentially all the tertiary olefins are reacted to form ethers before the tertiary olefins rise as vapors above tray 7. In most instances the linear pentenes will contain some pentanes (iso and normal) as impurities. However, it may be noted at this point that for many processes, as for example in the manufacture of certain chemicals, the alkanes may act as a diluent but they do not interfere by causing side reactions so as to lower the yield in the chemical manufacturing process.

The vapor stream which is withdrawn via line 21 is condensed in overhead condenser 22 by heat exchange with cooling water introduced via line 30 to overhead condenser 22. The condensed overhead is received by reflux drum 24 via line 27 and introduced to the upper part of the column; in this instance at tray 7 via line 27.

The product linear pentenes together with isopentane and normal pentane are withdrawn via line 25 from the reflux drum and then passed via line 26 to distillation column 40. In some instances it will be preferred to avoid the added expense of distillation column 40 and to use the linear pentenes directly from line 26. Typically the tertiary olefin content of the pentenes is less than 10 volume percent and usually less than about 1 to 5 volume percent.

However, in the schematic flow diagram of the preferred embodiment of the present invention the linear pentene stream is fed to distillation column 40 for further fractionation. Reboiling heat is supplied to the lower part of distillation column 40 by heating coil 45. Cooling so as to generate downward flowing liquid reflux is obtained by cooling coil 44 located in the upper part of distillation column 40. Distillation column 40 operates according to well known fractionation principles so that the relatively volatile isopentane is fractionated upward and withdrawn via line 41. The boiling point of isopentane is 27.9° C. whereas that of pentane is 36.1° C. Because the boiling point of normal pentane is bracketed by the boiling points of pentene 1 and the cis and trans pentene 2, the purified linear pentene stream withdrawn via line 42 contains most of the normal pentane. As indicated previously, this normal pentane is not a very harmful impurity as are the tertiary olefins. If desired, the normal pentane can be separated from the linear pentenes by reacting the linear pentenes with an organic acid to form an "ester" and distilling the normal pentane from the ester. Then the ester can be decomposed to give the linear pentenes and the organic acid. The linear pentenes can be easily fractionated from the organic acid. This method of obtaining a pure stream of linear pentenes can be carried out using two distillation reactors, for example as in the last half of the process discussed in my application titled "Separation of Chemicals Using Fractionation and Heterogeneous Catalysis" Ser. No. 852,225, filed on or about Aug. 22, 1969.

A small stream of relatively heavy hydrocarbons such as hexanes is withdran from the bottom of distillation column 40 via line 43. If feed preparation results in a fairly pure $C_5$ cut, then distillation column 40 can be used to simply fractionate isopentane overhead, with the linear pentanes being removed from the bottom of the column via line 43 instead of as a side stream via line 42.

Although various specific embodiments of the invention have been described and shown, it is to be understood they are meant to be illustrative only and not limiting. Certain features may be changed without departing from the spirit or essence of the invention. It is apparent that the present invention has broad application to the separation of linear olefins from tertiary olefins. Accordingly, the invention is not to be construed as limited to the specific embodiments illustrated but only as defined in the appended claims.

I claim:

1. A process for separating linear olefins from tertiary olefins which comprises:
   (a) feeding a mixture of teritary olefins and linear olefins to a distillation column reactor at a feed zone;
   (b) feeding an alcohol to the distillation column reactor;
   (c) contacting a mixture of the tertiary olefins and the alcohol with heterogeneous catalyst located in a plurality of zones above the feed zone, said catalyst accelerating the equilibrium-limited reaction of the tertiary olefin with the alcohol to form an ether;
   (d) fractionating the ether from the linear olefins in the distillation column reactor;
   (e) withdrawing the ether from the distillation column reactor at a position below the feed zone; and
   (f) withdrawing the linear olefins from the distillation column reactor at a position above the feed zone.

2. A process for separating linear pentenes from tertiary pentenes which comprises:
   (a) feeding a mixture of tertiary pentenes and linear pentenes to a distillation column reactor at a feed zone;
   (b) feeding an alcohol to the distillation column reactor;
   (c) contacting a mixture of the tertiary pentenes and the alcohol with heterogeneous catalyst located in a plurality of zones above the feed zone, said catalyst accelerating the equilibrium-limited reaction of the teritary pentenes with the alcohol to form an ether;
   (d) fractionating the ether from the linear pentenes in the distillation column reactor;
   (e) withdrawing the ether from the distillation column reactor at a position below the feed zone; and
   (f) withdrawing the linear pentenes from the distillation column reactor at a position above the feed zone.

3. A process in accordance with claim 2 wherein the mixture of tertiary pentenes and linear pentenes contains 2-methyl butene-1 and 2-methyl butene-2 and pentene-1 and pentene-2.

4. A proceess in accordance with claim 3 wherein the mixture of tertiary pentenes and linear pentenes also contains isopentane and the isopentane is withdrawn from the distillation column reactor together with the linear pentenes, and the isopentane is fractionated from the pentenes.

5. A process for separating linear pentenes and tertiary pentenes which comprises:
   (a) feeding the linear and tertiary pentenes into a distillation column at a feed zone;
   (b) feeding an alcohol into the distillation column;
   (c) applying heat below the feed zone of the column so as to generate upward flowing vapors in the column;
   (d) removing heat above the feed zone of the column so as to obtain downward flowing liquid in the column;

(e) contacting a mixture of the tertiary pentene and the alcohol with heterogeneous catalyst masses located in a plurality of zones above the feed zone, said catalyst accelerating the equilibrium-limited reaction of the tertiary pentene with the alcohol to form an ether;
(f) fractionating the linear pentene from the ether in the distillation column reactor;
(g) withdrawing the ether from the distillation column reactor at a position below the feed zone; and
(h) withdrawing the linear pentenes from the distillation column reactor at a position above the feed zone.

6. A process in accordance with claim 5 wherein the heterogeneous catalyst is located in a series of zones extending upwardly from the feed zone of the distillation column.

7. A process in accordance with claim 6 wherein several separate masses of catalysts are located in the column above the feed zone.

References Cited
UNITED STATES PATENTS

| | | | |
|---|---|---|---|
| 3,121,124 | 2/1964 | Verdol | 260—677 |
| 3,170,000 | 2/1965 | Verdol | 260—677 |

DELBERT E. GANTZ, Primary Examiner

J. M. NELSON, Assistant Examiner

U.S. Cl. X.R.

203—28